United States Patent [19]

Bradley

[11] Patent Number: 5,651,589

[45] Date of Patent: Jul. 29, 1997

[54] VEHICLE WHEEL

[75] Inventor: Robert A. Bradley, Fullerton, Calif.

[73] Assignee: Ultra Wheel Co., Buena Park, Calif.

[21] Appl. No.: 622,787

[22] Filed: Mar. 27, 1996

[51] Int. Cl.$^6$ .................................................. B60B 21/06
[52] U.S. Cl. ................................. 301/54; 301/58; 301/79
[58] Field of Search .............................. 301/54, 67, 70, 301/73, 74, 79, 58, 59, 95; 29/894.34, 894.341, 894.342

[56] References Cited

U.S. PATENT DOCUMENTS

| | | |
|---|---|---|
| D. 34,108 | 2/1901 | Brayton . |
| D. 176,544 | 1/1956 | Lyon . |
| D. 256,795 | 9/1980 | Blanchard . |
| D. 259,342 | 5/1981 | Envall et al. . |
| D. 292,389 | 10/1987 | Boyle et al. . |
| D. 292,568 | 11/1987 | Cafaro et al. . |
| D. 292,691 | 11/1987 | Envall . |
| D. 299,918 | 2/1989 | Envall et al. . |
| D. 300,422 | 3/1989 | Schinella . |
| D. 300,818 | 4/1989 | Reid . |
| D. 316,844 | 5/1991 | Peloquin et al. . |
| D. 322,421 | 12/1991 | Shinoda . |
| D. 323,138 | 1/1992 | Malmgren et al. . |
| 3,645,580 | 2/1972 | Spies ................................. 301/59 X |
| 4,345,795 | 8/1982 | Schardt ................................. 301/59 X |
| 4,448,456 | 5/1984 | Pfundstein ................................. 301/74 X |
| 4,824,177 | 4/1989 | Aloy ................................. 301/58 |

FOREIGN PATENT DOCUMENTS 4339001  11/1992  Japan ................................. 301/54

OTHER PUBLICATIONS 16 page catalog captioned Cragar—The Wheel People, undated.

16 page catalog captioned American Racing Equipment—Custom Wheels 1992, with copyright notice 1991.

8 page catalog captioned Progressive 1991 Catalog, with copyright notice 1991.

20 page catalog captioned Keystone—The Wheel Makers, with legend Effective Mar. 8, 1991.

*Primary Examiner*—Russell D. Stormer
*Attorney, Agent, or Firm*—Pretty, Schroeder & Poplawski

[57] ABSTRACT

A vehicle wheel having a hub and a rim joined by a plurality of spokes supporting the rim on the hub, the rim having a center section and inner and outer flanges, with a spoke receiving section in the rim joining the rim center section and outer flange, the spoke receiving section being of a thickness greater than the center section, with a plurality of radially positioned spoke receiving passages in the spoke receiving section. The spoke receiving passages comprise a first set of passages alternating with a second set of passages, with the passages of the first set slanting inward toward the center of the rim and with the passages of the second set slanting outward toward the outer flange of the rim.

14 Claims, 6 Drawing Sheets

VEHICLE WHEEL

BACKGROUND OF THE INVENTION

This invention relates to wheels for vehicles and in particular to a wheel with a rim carried on a hub by spokes.

Various forms of wire wheels have been in use for many years. One of the problems with earlier designs is the relatively heavy weight of the finished wheel required to obtain the desired wheel strength. This is a particular problem with modern day vehicles using front wheel drives. Prior designs have been made of sheet metal of uniform thickness which is extruded or rolled to the desired configuration and then formed into a circle. The uniform thickness is a problem with wire wheel construction. Anchorages for spokes require a dimpling of the metal of the rim. Also in some prior designs, the rim is made in two pieces with an inner rim for spoke anchorage and an outer rim for receiving the tire, with the two rim pieces welded together after placement of the spokes. In the earlier designs, the spokes terminate well inward from the outer edge of the rim with little or no offset from the center line of the wheel. On rims that are dimpled in the tire bead seat area, the dimple is shallow and when the tire is mounted, it tends to pull away the sealing adhesive and cause air leaks.

SUMMARY OF THE INVENTION

Accordingly, it is an object of the present invention to provide a new and improved vehicle wheel utilizing spokes for the support of the rim on the wheel, which design sometimes is referred to as a wire wheel. An additional object is to provide a new and improved rim suitable for use with such a wheel. It is a further object of the invention to provide such a wheel which can be produced by casting, and one which can have a significant increase in thickness adjacent the outer flange to provide a strong anchorage for the spokes without requiring any dimpling. An additional object is to provide such a wheel construction in which the spokes may be positioned adjacent the outer rim, with an offset from the wheel center line. In the design of the present of invention, the offset may be made positive or negative as desired. A particular object is to provide such a wire wheel construction which will have increased load rating with decreased overall weight.

The preferred embodiment of the invention includes a vehicle wheel having a hub and a rim joined by a plurality of spokes supporting the rim on the hub, the rim having a center section and inner and outer flanges, with a spoke receiving section in the rim joining the rim center section and outer flange, with the spoke receiving section being of a thickness greater than the center section, and with a plurality of radially positioned spoke receiving passages in the spoke receiving section.

Preferably the spoke receiving passages comprise a first set of passages alternating with a second set of passages, with the passages of the first set slanting inward toward the center of the rim and with the passages of the second set slanting outward toward the outer flange of the rim, with the rim having a center line and with the hub having a wheel mounting face, with the hub wheel mounting face outward from the rim center line.

Also preferably the hub has a tubular section outward from the wheel mounting face, with first and second sets of spoke anchor passages positioned alternatingly around the hub tubular section, and with the second set of spoke anchor passages outward from the first set, with the spokes alternatingly positioned in a first set spoke receiving passage and a first set spoke anchor passage, and in a second set spoke receiving passage and a second set spoke anchor passage.

The rim desirably is of a cast metal, with the spoke receiving section and outer flange of the rim having a smooth continuous inner surface.

Other objects, advantages, features and results will more fully appear in the course of the following description.

DESCRIPTION OF THE PREFERRED EMBODIMENTS

Figure 1:
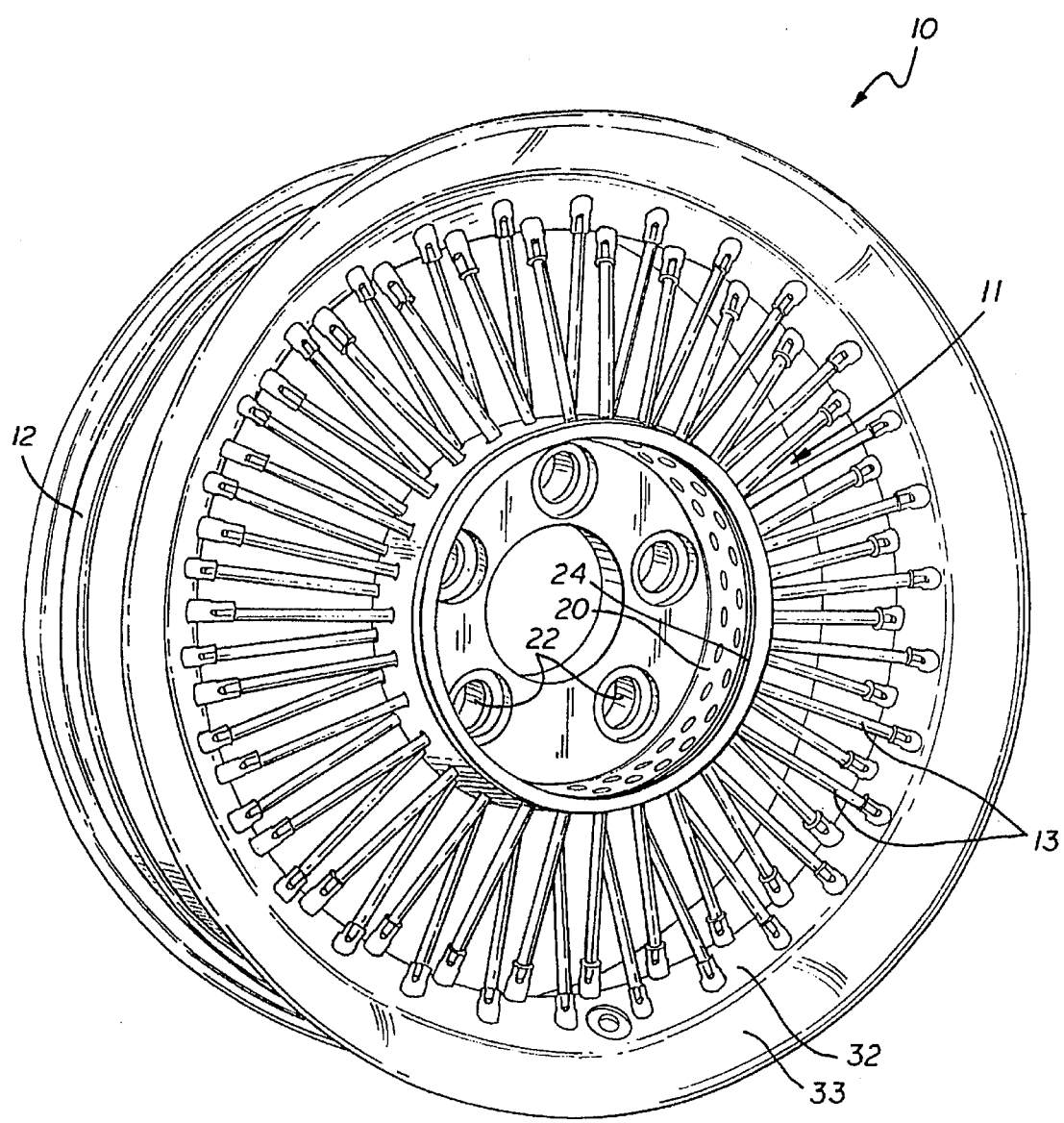
FIG. 1 is a perspective view from the outer side of a vehicle wheel incorporating the presently preferred embodiment of the invention.
Figure 2:
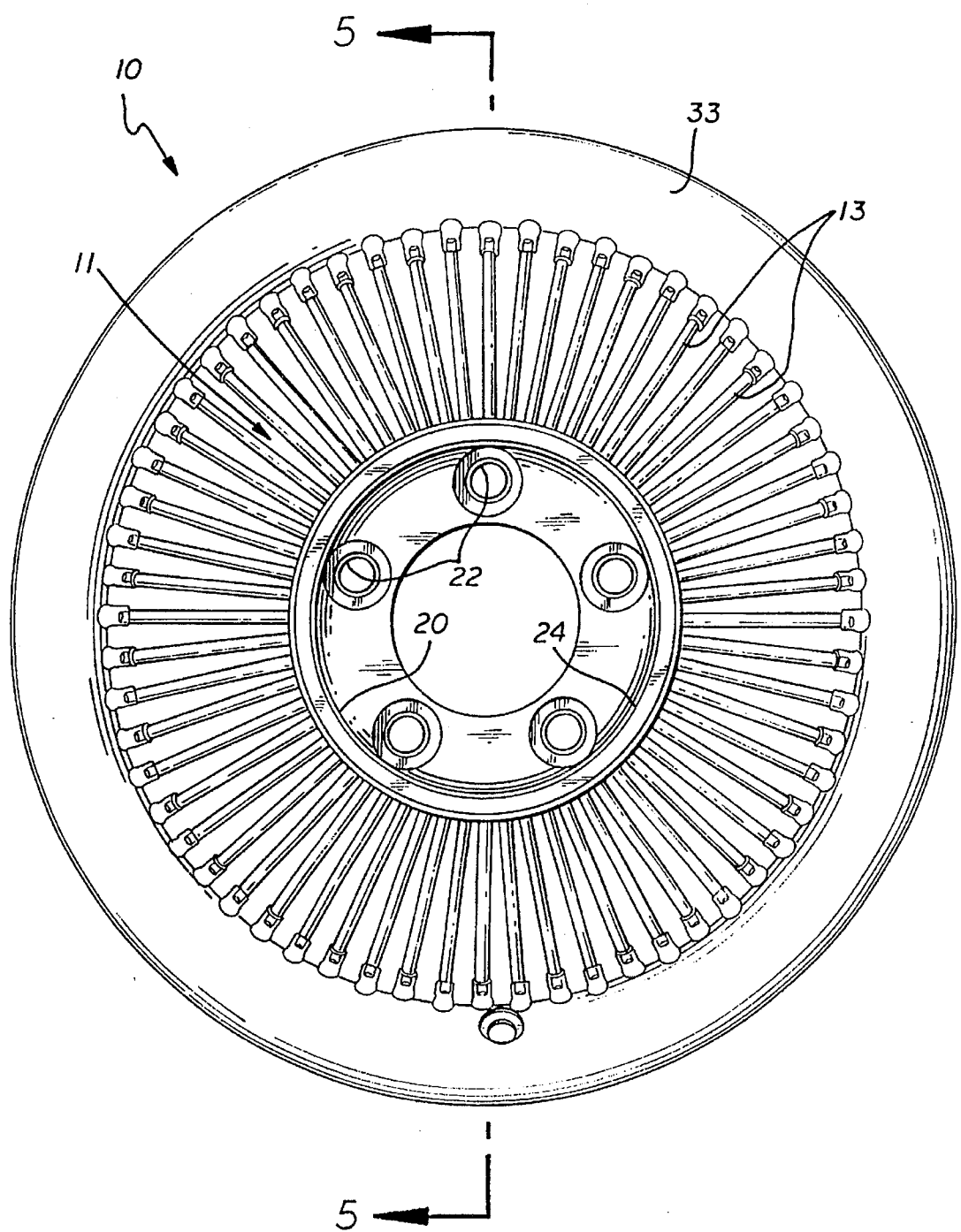
FIG. 2 is a side view from the outer side of the wheel of FIG. 1.
Figure 3:
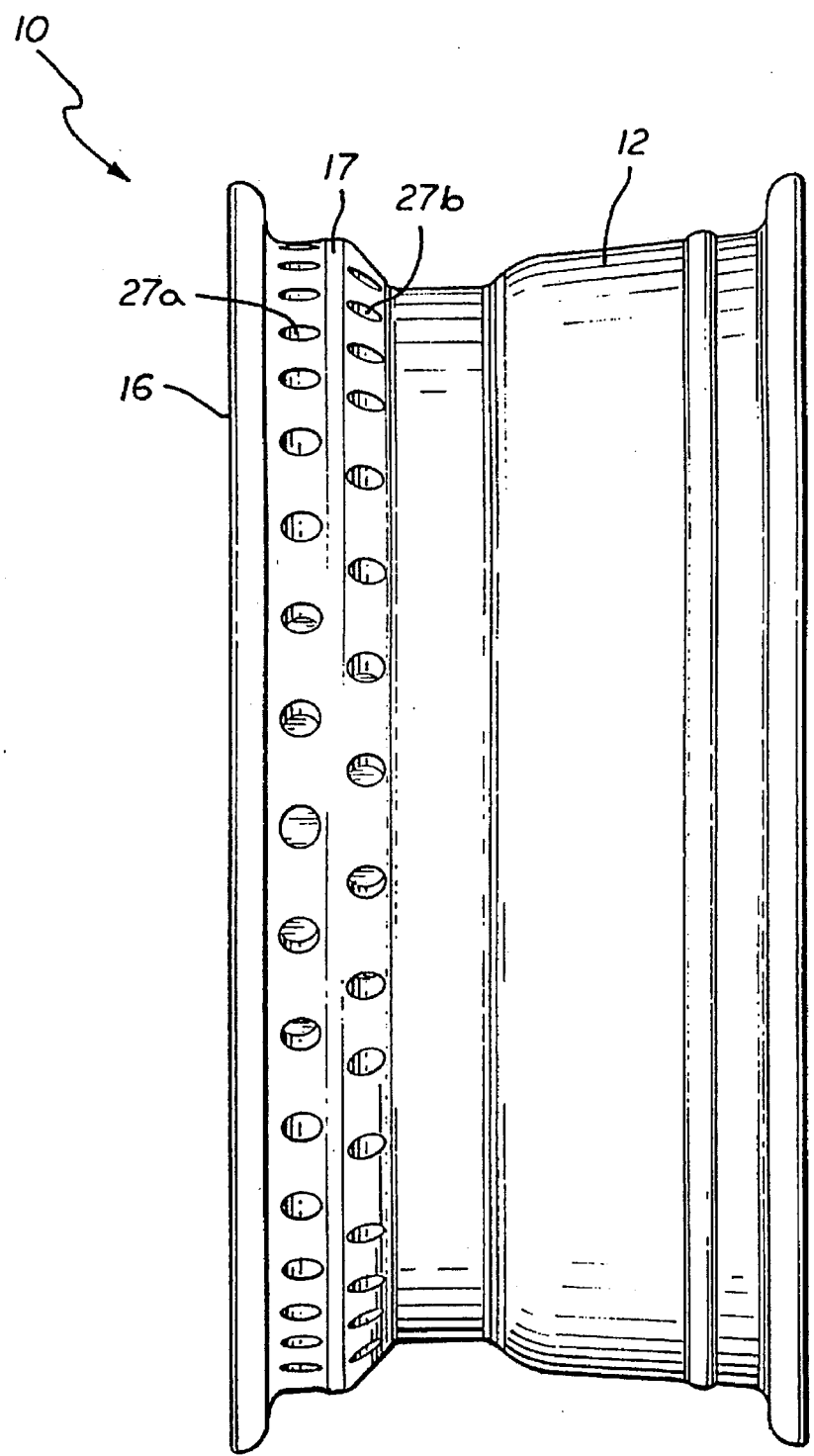
FIG. 3 is a side view of the rim of the wheel of FIG. 1.
Figure 4:
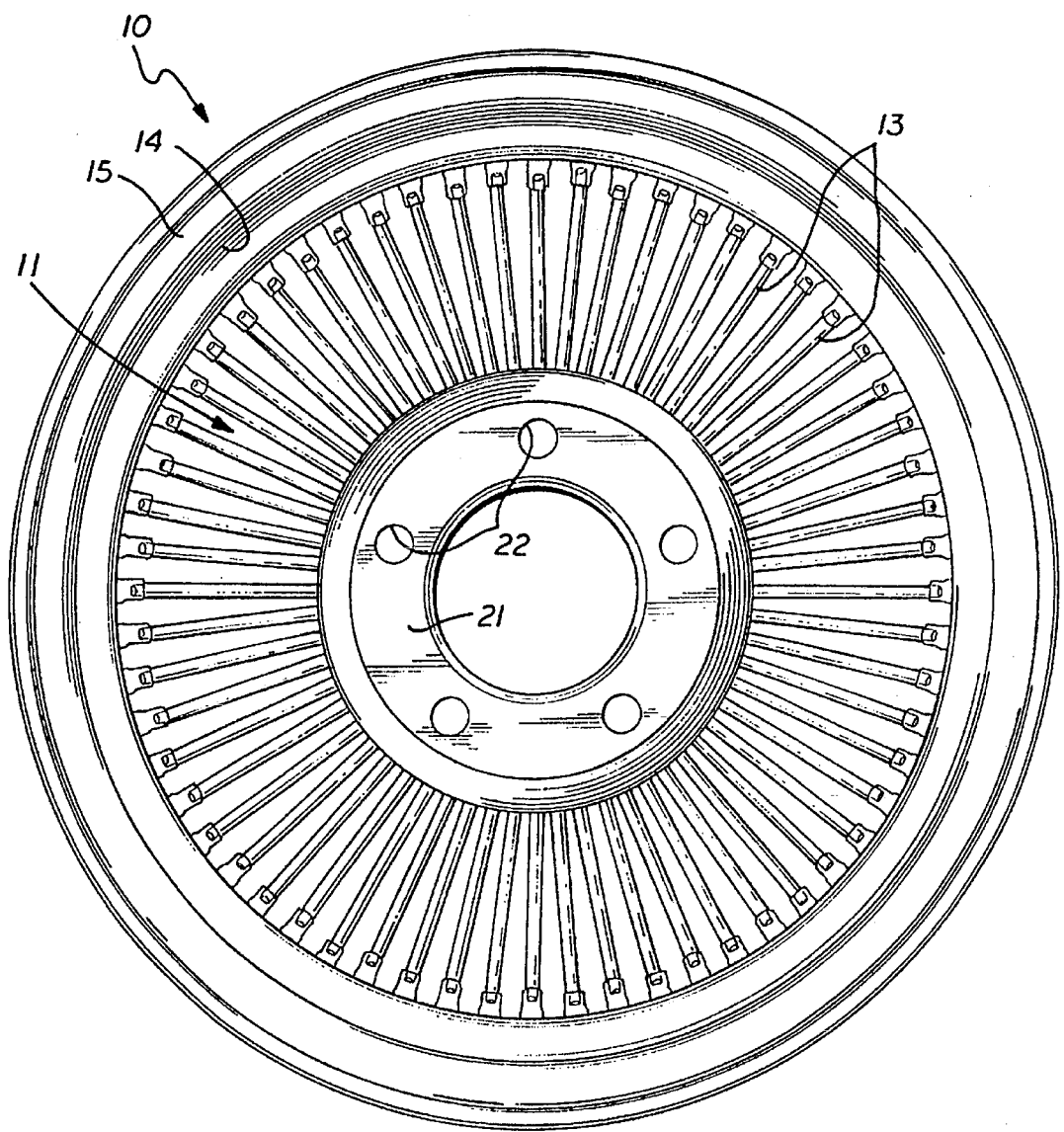
FIG. 4 is a side view of the inner side of the wheel of FIG. 1.

Referring to the drawings, the wheel 10 includes a hub 11 and a rim 12, with the rim supported on the hub by a plurality of spokes 13. The outer surface of the rim is designed for receiving a tire, and includes a center section 14 with an inner flange 15 and an outer flange 16. The rim also includes a spoke receiving section 17 between the center section and the outer flange.

Figure 5:
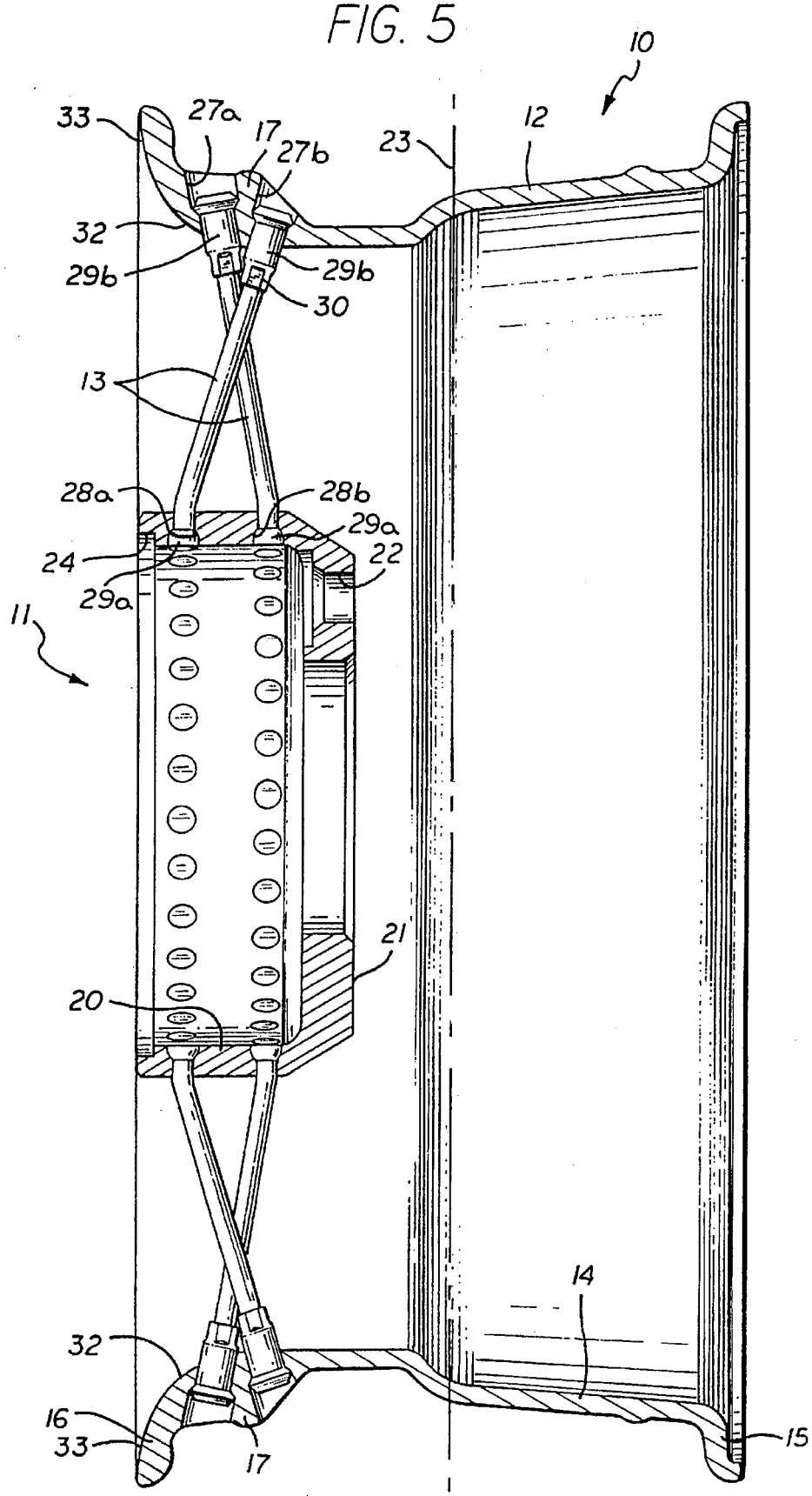
FIG. 5 is an enlarged sectional view of the wheel of FIG. 1.

The hub 11 includes a generally tubular section 20 for receiving the spokes, and a wheel mounting face 21, with mounting bolt openings 22. In the embodiment illustrated in FIG. 5, the wheel mounting face 21 is outboard from the center line 23 of the rim, a condition known as a "positive offset". The wheel construction of the present invention can provide a positive offset as illustrated in FIG. 5, or a no offset construction with the face 21 in line with the center line 23, or a negative offset with the face 21 inboard from the center line. In wheels for present day vehicles with front wheel drive, it is desirable to have a relatively high positive offset, typically in the order of 40 millimeters. This construction has been difficult to achieve with prior wire wheel constructions. Desirably, a recess 24 is provided in the outer face of the hub for receiving a panel or lug nut cover plate.

A plurality of spoke receiving passages are provided in the spoke receiving section 17 of the rim. The spoke receiving section 17 of the rim is thicker than the center section 14 as seen in FIG. 5, preferably being at least about twice as thick as the center section. In an alternative configuration, the thicker spoke receiving section 17 could extend further toward the center line of the rim, permitting the spoke receiving passages to be positioned nearer the center line, and providing a negative offset for the wheel. Preferably the spoke receiving passages are arranged in two sets 27a and 27b, with the passages of the first set 27a slanting inward toward the center of the rim and with the passages of the second set 27b slanting outward toward the outer flange of the rim.

Corresponding sets of spoke anchor passages 28a and 28b are provided in the hub 11. Typically each spoke has an enlarged inner end 29 for resting in a mating enlarged inner end of the passages 28a, 28b. These spoke anchoring passages preferably are radial, with a bend in the spoke to provide the slant configuration, as best seen in FIG. 5. Typically the outer ends of the spokes are threaded to receive anchor nuts 29 which are passed inward through the rim and screwed onto the outer end of the spoke. Flats 30 typically are provided on the anchor nuts 29 for engagement by a wrench or other tool. The anchor nuts have an enlarged head for engaging a shoulder in the spoke receiving passage.

In the preferred embodiment, the rim is a casting, typically of aluminum. With the cast construction, the spoke receiving sections 17 may be made substantially thicker than the remainder of the rim. This construction provides additional strength at the spoke receiving section without significantly increasing the overall weight of the rim. Also, this construction eliminates the need for dimpling of the rim for mounting the individual spokes.

Another desirable feature of the construction as illustrated in FIG. 5 is the smooth continuous shape of the inner surface 32 of the spoke receiving section, which may continue to the inner surface 33 of the outer flange 16. Some alternative shapes for the spoke receiving section 17 are shown in FIGS. 6, 7 and 8.

Figure 6:
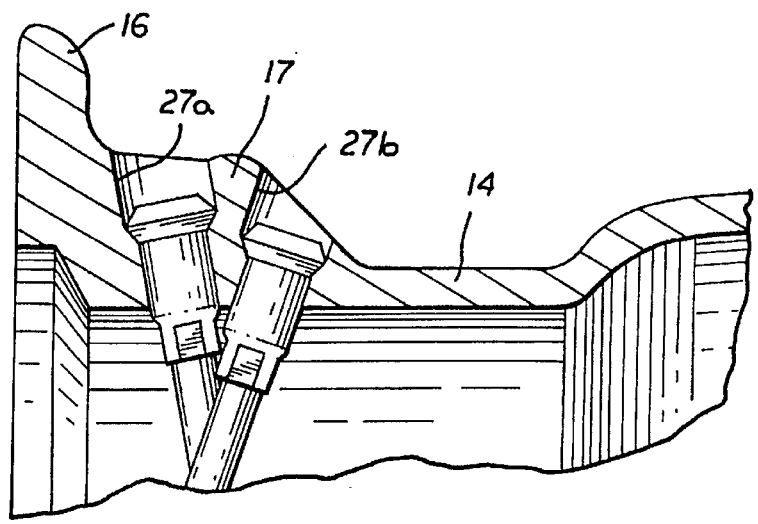
FIGS. 6, 7 and 8 are enlarged partial views of the outer flange of the rim of the wheel of FIG. 5 showing alternative embodiments for the spoke receiving section of the rim.
Figure 7:
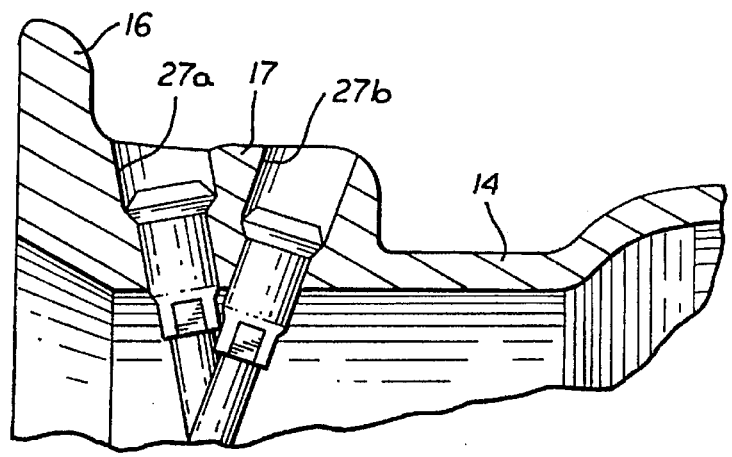
Figure 8:
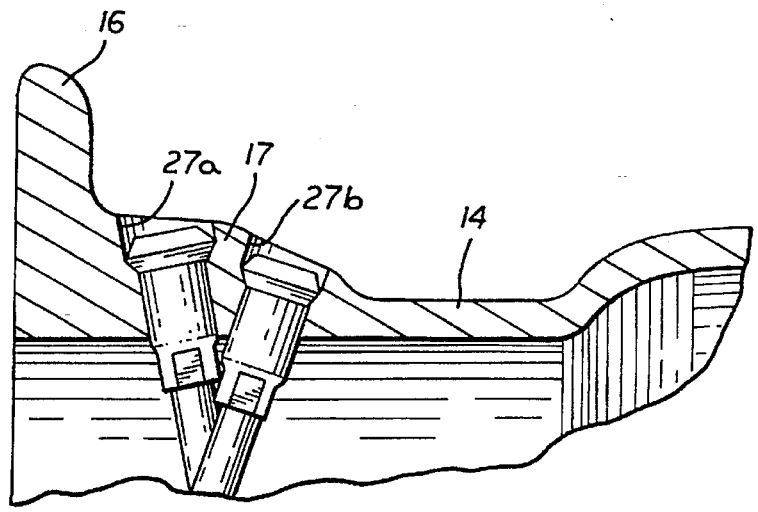

FIGS. 6, 7 and 8 have planar surfaces rather than the curved inner surface 33 of FIG. 5. In the embodiment of FIG. 6, the surface of the spoke receiving section 17 at the opening 27b is frustroconical as in FIG. 5, and the central opening in the rim is stepped, comprising a smaller cylindrical surface, a frustroconcial surface and a larger cylindrical surface. In the embodiment of FIG. 7, the spoke receiving section is substantially cylindrical at the opening 27b, and the central opening is cylindrical and then frustroconical at the outer edge. In the embodiment of FIG. 8, the spoke receiving section 17 is frustroconical at the opening 27b, but of a lesser thickness than that of FIG. 6, while the central opening is cylindrical.

The construction of the wheel of the present invention utilizing a cast rim with an enlarged spoke receiving section permits manufacture of a wire wheel of relatively low weight while meeting the test load requirements. By way of example, 60 and 80 spoke wire wheels using the construction of the present invention will meet up to 1,400 and 2,000 pound test load requirements, respectively, while weighing about 25 pounds, in contrast to prior wire wheel constructions for the same test loads which weigh about 35 pounds. This reduction of weight is significant because the heavier wheel results in increased wear on the vehicle suspension system, especially with front wheel drive configurations.

Also the design of the present invention permits ease of manufacture of the rim in a single piece, in contrast to some prior designs which use a two piece rim. In such a wheel construction, the inner rim carries the anchors for the spokes, with the inner rim then being welded in place in the outer rim.

The smooth rim surface is easier to polish and chrome plate, compared to a dimple form. The smooth rim is also easier to clean when in use on the car, there being no pockets for brake dust to collect.

I claim:

1. In a vehicle wheel having a hub and a rim joined by a single row of interlaced spokes supporting the rim on the hub, the rim having a cylindrical center section and inner and outer planar flanges, the improvement comprising a spoke receiving section in said rim joining said rim cylindrical center section and outer planar flange, said spoke receiving section being contiguous with said outer planar flange and of a thickness greater than said cylindrical center section and continuing to said outer planar flange, with a plurality of radially positioned spoke receiving passages in said spoke receiving section.

2. A wheel as defined in claim 1 wherein said spoke receiving passages comprise a first set of passages alternating with a second set of passages, with the passages of said first set slanting inward toward the center of the rim and with the passages of said second set slanting outward toward the outer flange of the rim.

3. A wheel as defined in claim 2 with said rim having a center line and with said hub having a wheel mounting face, with said hub wheel mounting face outward from said rim center line.

4. A wheel as defined in claim 3 with said hub having a tubular section outward from said wheel mounting face, with first and second sets of spoke anchor passages positioned alternatingly around said hub tubular section, and with said second set of spoke anchor passages outward from said first set, with said spokes alternatingly positioned in a first set spoke receiving passage and a first set spoke anchor passage, and in a second set spoke receiving passage and a second set spoke anchor passage.

5. A wheel as defined in claim 4 wherein said rim is of a cast metal.

6. A wheel as defined in claim 5 wherein said spoke receiving section of said rim has a smooth continuous inner surface.

7. A wheel as defined in claim 5 wherein said spoke receiving section and outer flange of said rim have a smooth continuous inner surface.

8. A rim for a vehicle wheel and having a cylindrical center section and inner and outer planar flanges, said rim further having a spoke receiving section joining said cylindrical center section and outer planar flange, said spoke receiving section being contiguous with said outer planar flange and of a thickness greater than said cylindrical center section and continuing to said outer planar flange.

9. A rim as defined in claim 8 wherein said spoke receiving section has a smooth continuous inner surface.

10. A rim as defined in claim 8 wherein said spoke receiving section and outer flange have a smooth continuous inner surface.

11. A rim as defined in claim 8 including means defining a plurality of radially positioned spoke receiving passages in said spoke receiving section.

12. A rim as defined in claim 11 wherein said spoke receiving passages comprise a first set of passages alternating with a second set of passages, with the passages of said first set slanting inward toward the center of the rim and with the passages of said second set slanting outward toward the outer flange of the rim.

13. A rim as defined in claim 12 wherein said rim is of a cast metal.

14. In a vehicle wheel having a hub and a rim joined by a plurality of spokes supporting the rim on the hub, the rim having a cylindrical center section and inner and outer planar flanges, the improvement comprising a spoke receiving section in said rim joining said rim cylindrical center section and outer planar flange, said spoke receiving section being of a thickness greater than said cylindrical center section and continuing to said outer planar flange, with said rim of cast metal, and with said spoke receiving section and outer planar flange of said rim having a smooth continuous inner surface, with a plurality of radially positioned spoke receiving passages in said spoke receiving section.

* * * * *